Feb. 4, 1964     J. BROWN ET AL     3,120,277
ROTOR BLADE LOCKING APPARATUS
Filed April 30, 1963     2 Sheets-Sheet 1

INVENTORS
James Brown
John William Hawkins
By Stevens, Davis, Miller + Mosher
ATTORNEYS

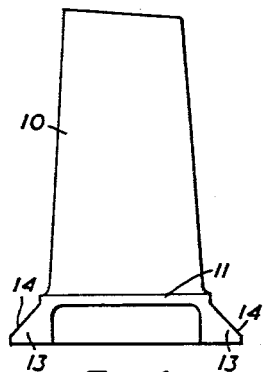
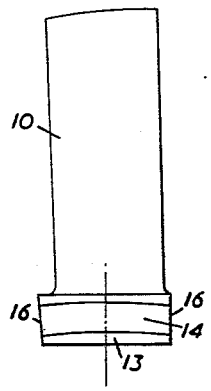
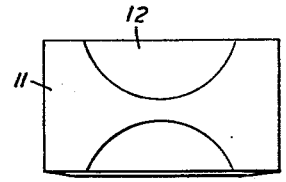
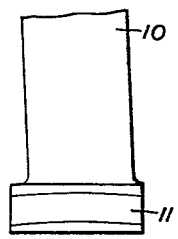
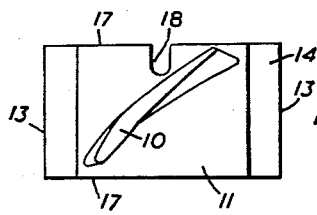
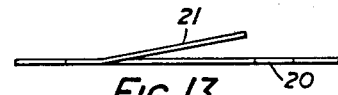
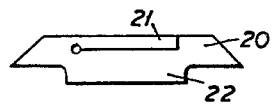
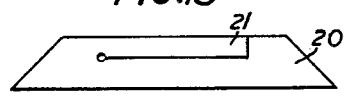
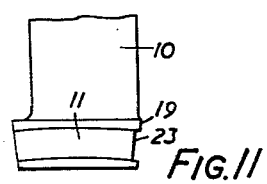
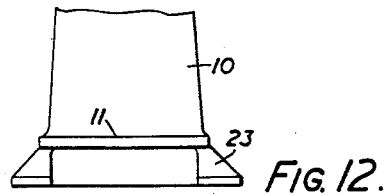

United States Patent Office 3,120,277
Patented Feb. 4, 1964

3,120,277
ROTOR BLADE LOCKING APPARATUS
James Brown, Fleet, and John W. Hawkins, Sunbury-on-Thames, Middlesex, England, assignors to Power Jets (Research & Development) Limited, London, England, a British company
Filed Apr. 30, 1963, Ser. No. 276,779
Claims priority, application Great Britain May 8, 1962
5 Claims. (Cl. 170—173)

The present invention relates to a rotor for a compressor, turbine or like fluid flow machine.

A rotor has been proposed comprising a disc or drum having a circumferential channel defined by a base and side walls each having a flange extending into the channel, a plurality of blades located in the channel, each having a root formed on opposite sides with a pair of projections, one projection of each pair engaging under the adjacent flange to prevent radial outward movement of the blade under centrifugal force and the other projection of each pair engaging over the adjacent flange to prevent radial inward movement of the blade due to its weight. To permit the blades to be assembled on the disc or drum a portion of the flange is cut-away and to prevent the blade located at the cut-away portion from moving radially inwardly a member secured to the root of that blade is caused to engage with the disc or drum.

A disadvantage of this construction is that when the rotor is rotating at high speed the radially inner root projections as well as the rotor flanges on which they bear have not only to carry the centrifugal loads normally associated with rotor blades but also the extra loads due to the presence of the radially outer projection and the increased size of the root itself necessary to permit the formation of the pairs of projections.

It is an object of the present invention to provide an improved rotor in which the disadvantage referred to above is at least reduced.

According to the present invention a rotor includes a disc or drum having a circumferential channel defined by a base and side walls each having a flange extending into the channel, a circularly extending rib on each channel side wall spaced radially inwardly of the flange to define therewith a guideway, a plurality of blades located in the channel, each blade having a root formed with projections locatable in the guideways whereby the blade is prevented from moving radially outwardly by the flanges and radially inwardly by the ribs, and an entry to permit the blade root projections to be located in the guideways formed by cutting away a portion of at least one of the ribs.

Preferably a lockable blade is provided to complete the circle of blades and a locking device is mounted on at least one of the blades contacting the lockable blade, the device engaging the lockable blade to prevent radial inward movement of the latter relative to the blade on which the device is mounted. The locking device may comprise a resiliently flexible metal strip shaped to fit snugly into a groove formed in the root of a blade contacting the lockable blade and have an integral leaf portion adapted to extend away from the groove into engagement with the lockable blade root.

In a preferred embodiment of the invention at least two abutments are provided extending into and spaced symmetrically around one of the guideways, entries being formed to permit the blade root projections to be located in the sections of the guideways between pairs of abutments.

It will be appreciated that the present rotor construction gives a number of advantages over the prior construction. The overall mass of the blade is smaller than that of a comparable blade of prior construction which in consequence permits the flanges provided on the rotor to prevent radial outward movement of the blades to be of less substantial construction. Any reduction of the mass carried at the periphery of the rotor is, of course, of major importance in view of the large centrifugal forces developed at the high peripheral speeds normally encountered with such machines.

An embodiment of a rotor according to the invention will now be described by way of example, reference being made to the accompanying drawings, in which:

FIGURES 6 and 7 are elevational views of adjacent sides of a standard blade for the rotor disc or drum;

FIGURE 8 is an inverted plan view of the blade of FIGURES 6 and 7;

FIGURES 9 and 10 are elevational and inverted plan views, respectively, of a lockable blade for the rotor disc or drum;

FIGURES 11 and 12 are elevational views of adjacent sides of a special blade further modified to receive the locking device of FIGURES 11 and 12;

FIGURES 13 and 14 are plan and elevational views respectively of a blade locking device; and FIGURE 15 is a plan view of a modified blade locking device.

Figure 3:
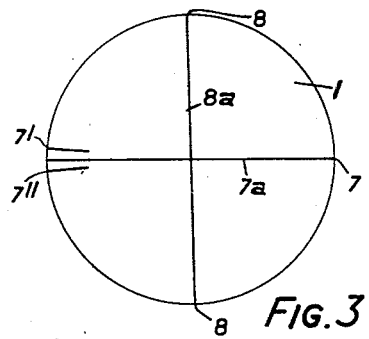
FIGURE 3 is a diagrammatic axial view of the rotor disc or drum.
Figure 1:
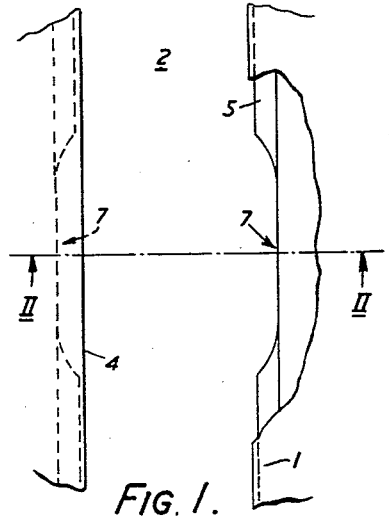
FIGURE 1 is a developed view of part of the rotor disc or drum.
Figure 2:
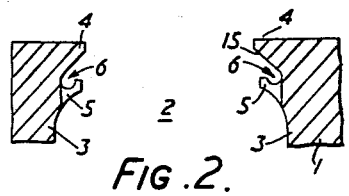
FIGURE 2 is a section on the line II—II of FIGURE 1.
Figure 4:
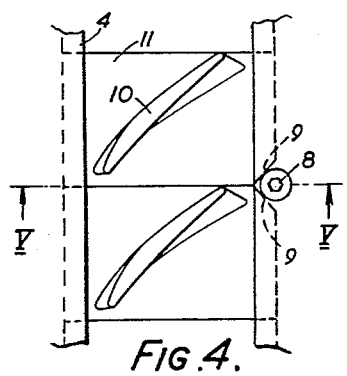
FIGURE 4 is a developed view of another part of the rotor disc or drum.
Figure 5:
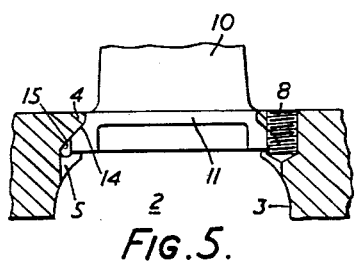
FIGURE 5 is a section of the line V—V of FIGURE 4.

Referring first to FIGURES 1 to 5 a rotor comprises a disc or drum 1 having a circumferential channel 2 defined by a base (not shown) and side walls 3 which have flanges 4 extending into the channel. Circularly extending ribs 5 spaced radially inwardly of the flanges 4 are provided on the side walls 3 and define with the flanges 4 blade root guideways 6. The ribs 5 are cut away at two diametrically opposed locations (FIGURE 1) to provide a pair of entries 7 into the guideways 6 for the blade roots. Stops 8 are fixed in one of the guideways 6 at diametrically opposed locations and are constituted by screw-threaded pins inserted in screw-threaded bores extending through one of the flanges 4 and into its associated rib 5.

The diameters 8a and 7a on which the stops 8 and the entries 7, respectively, are located are at right angles to each other. It should be understood, however, that the expressions "diametrically opposed" and "at right angles" are not to be limited to their literal meaning but are to include within their scope the slight deviations imposed by the number of blades to be accommodated by the channel 2. This is illustrated in FIGURE 3 where, assuming fifty-one blades are to be accommodated by the channel, the centre of one entry 7 would be as shown, the centre of the other entry would be at 7' or 7" so that the entry would not be partly blocked by blades on either side but would be free to receive a lockable blade. Similarly one of the stops 8 would be offset from the diameter 8a so that it would not come at the centre of a blade. If the entries 7 and the stops 8, respectively, are offset with respect to the diameters of the disc or drum 1, the lines joining the entries 7 and abutments 8 may not be exactly at right angles to each other.

FIGURES 6, 7 and 8 are views of a standard blade for the rotor of the invention comprising a blade section 10 and a root 11. The root 11 is cuboidal and has two part circular recesses 12 in its underside to reduce the overall weight of the blade. The shorter sides of the root 11 are formed with projections 13 which have inclined surfaces 14 adapted to engage with correspondingly inclined surfaces 15 on the flanges 4. One longer side 16 of root 11 is made parallel to the radial plane of the blade while the other longer side 16 is inclined at a selected angle to the radial plane, this angle being 360° divided by the number of blades to be accommodated in the channel 2.

Those of the standard blades that are to abut against the stops 8 in an assembled rotor have the relevant corner 9 (FIGURE 4) cut-away by an amount sufficient to permit the blade to assume the required position in the channel 2.

FIGURES 9 and 10 show a lockable blade, i.e. a blade inserted last to complete each semi-circle of blades in the channel, comprising, as in the standard blade, a blade section 10 and a cuboidal root 11, the shorter sides of which are formed with projections 13 having flange-bearing surfaces 14. Recesses 12 in the underside of the lockable blade root besides reducing the weight of the blade have a further function to be described later. The longer sides 17 of the lockable blade root 11 are parallel with each other end to the radial plane of the blade.

A slit 18 is made in one (or both) of the longer sides of the locking blade root 11 to enable a locking device 20 to be disengaged from the recesses 12 in the blade root as will be described later.

FIGURES 11 and 12 show a special blade which is generally similar to both the standard blade and the lockable blade except that its longer sides 19 are both inclined at the selected angle to the radial plane of the blade.

The locking device 20 shown in FIGURES 13 and 14, is a resiliently flexible metal strip with a portion thereof cut and bent away from the remainder to form an integral leaf 21. The modified locking device 20 of FIGURE 15 has an extension 22 to give added strength.

The locking device 20 is designed to fit snugly in a groove cut in one of the longer sides 19 of the root of the special blade, as shown in FIGURE 11, or in one of the longer sides 16 of the root of a standard blade, the side selected being that which will abut the root of the lockable blade in the assembled rotor.

To assembly the rotor according to the invention the stops 8 are screwed into position and one semi-circular arc of the channel 2 is filled with blades. Each blade is located in the channel 2 by passing its root 11 through the selected entry 7, the shorter sides of the root being substantially at right angles to the walls 3. Once the root 11 is within the portion of the channel 2 radially inwardly of the ribs 5 the blade is turned through 90° about its longitudinal axis and withdrawn radially until the projections 13 can be entered into the guideways 6 where the blade root is prevented from moving radially outwardly by the flanges 4 and radially inwardly by the ribs 5. The blade is then moved circumferentially, the projections 13 thereof travelling along the guideways 6 until the root 11 abuts against the stop 8. This first blade has the stop-abutting corner 9 of its root cut-away as has the blade abutting the stop 8 at the other end of the semi-circular arc.

Each succeeding blade is inserted in the channel 2 until only space for two more blades, the lockable blade and the special blade, remains at the entry 7. The special blade is now inserted so that the parallel sided gap remaining to be filled by the lockable blade is in register with the entry 7. The dimensions of the gap are accurately measured and the longer sides 17 of the root 11 of the lockable blade are machined to the same dimensions so that when the blade is inserted its root 11 will be snug fit in the gap.

The standard blade on one side and the special blade on the other side of the entry 7 are released from the guideways 6 and the blades moved radially inwardly until their roots are at the bottom of the channel 2. The prepared lockable blade is placed in the channel 2 in the same way as the remaining blades. The standard blade and the special blade are then returned to their original positions in the guideways 6 and the lockable blade is drawn up between them. When the upper surface of the lockable blade root is level with the lower edge of the groove 23 in the special blade the locking device 20 is placed in the groove 23, the upper surface of the lockable blade root acting as a guide for this purpose, with the leaf portion 21 extending away from the groove. The leaf portion 21 is pressed back towards the groove 23 thus permitting the lockable blade to be drawn up into its correct position with the upper surface of its root 11 level with the upper surfaces of the roots 11 of the adjacent blades. When the lockable blade is in this position the leaf portion 21 of the locking device 20 resiliently returns to its initial position and extends within the recess 12 of the lockable blade root 11 where it prevents the lockable blade falling to the bottom of the channel 2.

The other semi-circular arc of blades is assembled in the manner just described to give a complete circle of blades around the drum or disc 1.

To remove one or more blades from a semi-circle a suitable instrument is inserted through the slit 18 to engage and bend back the leaf portion 21 so that it no longer extends into the recess 12 of the lockable blade root 11. The lockable blade can now be moved radially inwardly of the channel 2 until it bottoms. The locking device 20 can be removed from its groove 23, it being preferable to use the upper surface of the lockable blade root 11 as a guide to prevent the locking device 20 from falling into the channel. Each of the remaining blades can now be withdrawn from the channel 2 by reversing the assembly procedure, the lockable blade being withdrawable at any time after the first of the remaining blades has been removed.

It will be appreciated that the root 11 of the standard blade adjacent the lockable blade instead of the special blade may be modified to receive the locking device 20 or alternatively the roots 11 of both these blades may be modified. Of course the slit 18 must be made in the side of the lockable blade root that is to be adjacent the locking device 20 in the assembled rotor or in both sides if two locking devices 20 are used.

What we claim is:

1. A rotor including a disc or drum having formed therein a circumferential channel defined by a base and side walls, a flange extending into the channel from each side wall, a circularly extending rib on each channel side wall spaced radially inwardly of the flange to define therewith a guideway, a plurality of blades located in the channel, a root portion on each blade, projections formed on each root portion locatable in the guideways whereby the blade is prevented from moving radially outwardly by the flanges and radially inwardly by the ribs, a portion of at least one of the ribs being cut away to define an entry to permit the blade root projections to be located in the guideways.

2. A rotor according to claim 1, wherein a lockable blade is provided to complete the circle of blades.

3. A rotor according to claim 2, wherein a locking device is mounted on at least one of the blades contacting the lockable blade, the device engaging the lockable blade to prevent radial inward movement of the latter relative to the blade on which the device is mounted.

4. A rotor according to claim 3, wherein the locking device comprises a resiliently flexible metal strip, a leaf portion integral with the metal strip, at least one of said blades contacting the lockable blade having a groove formed therein, into which groove the metal strip is adapted to fit snugly with the leaf portion extending away therefrom into engagement with the lockable blade root.

5. A rotor according to claim 1, wherein at least two abutments are provided extending into and spaced symmetrically around one of the guideways, portions of the ribs being cut away to form entries permitting the blade root projections to be located in the sections of the guideways between the abutments.

References Cited in the file of this patent

UNITED STATES PATENTS

| | | |
|---|---|---|
| 2,315,631 | Lloyd et al. | Apr. 6, 1943 |
| 2,921,770 | Frankel | Jan. 19, 1960 |